July 22, 1969  D. L. DODGE ET AL  3,457,503
POTENTIOMETER LINEARITY AND CONFORMITY CHECKING
APPARATUS INCLUDING PROGRAM STORAGE MEANS
Filed Jan. 13, 1965  3 Sheets-Sheet 1
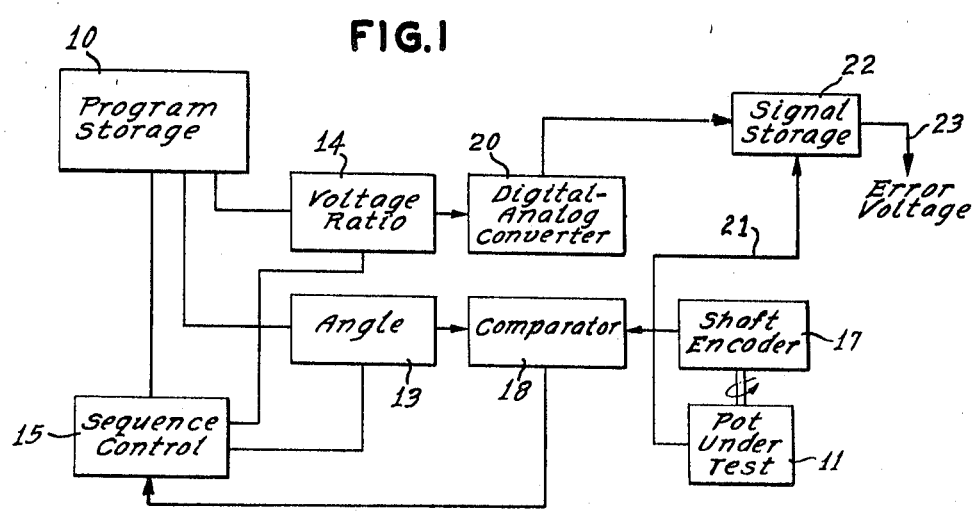
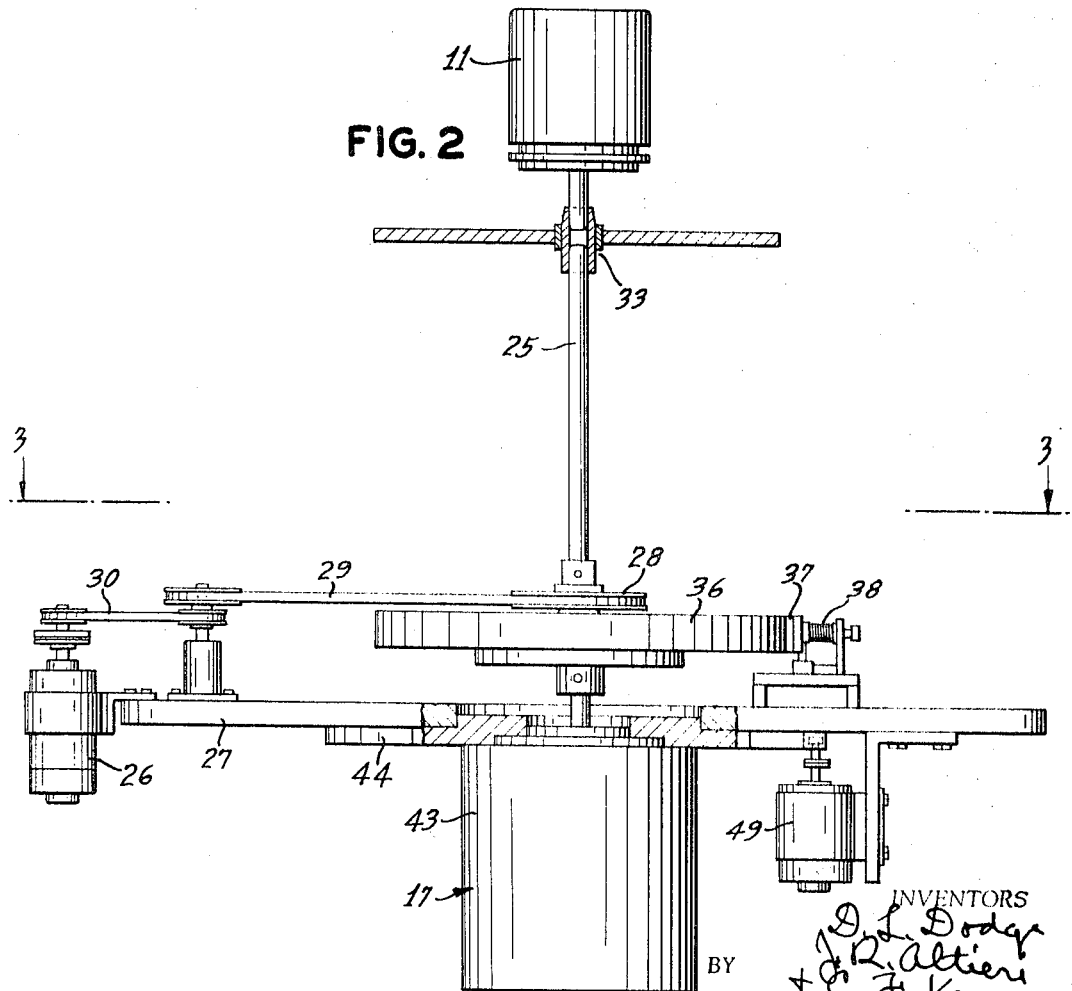

July 22, 1969 D. L. DODGE ET AL 3,457,503
POTENTIOMETER LINEARITY AND CONFORMITY CHECKING
APPARATUS INCLUDING PROGRAM STORAGE MEANS
Filed Jan. 13, 1965 3 Sheets-Sheet 2
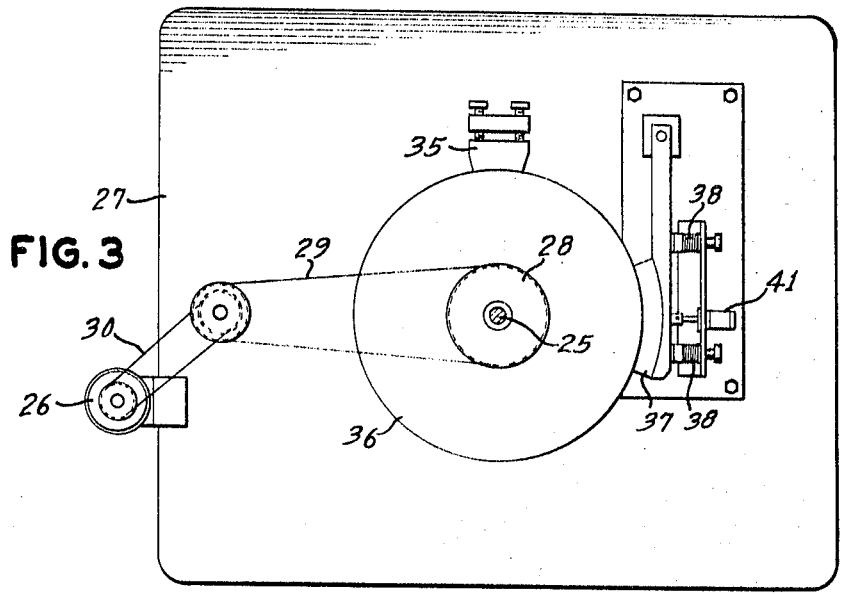
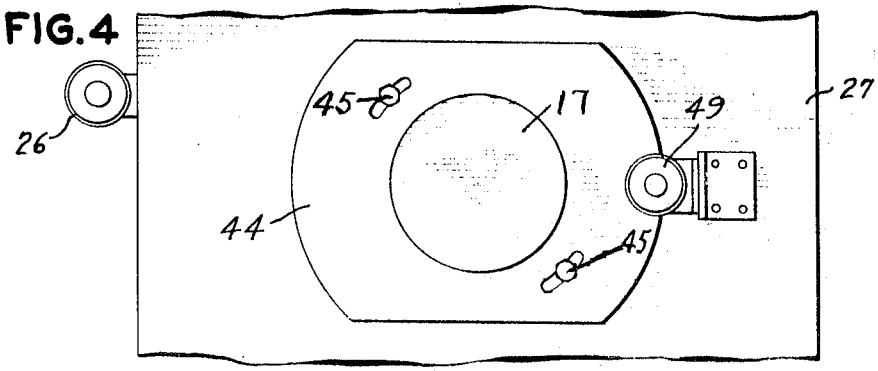
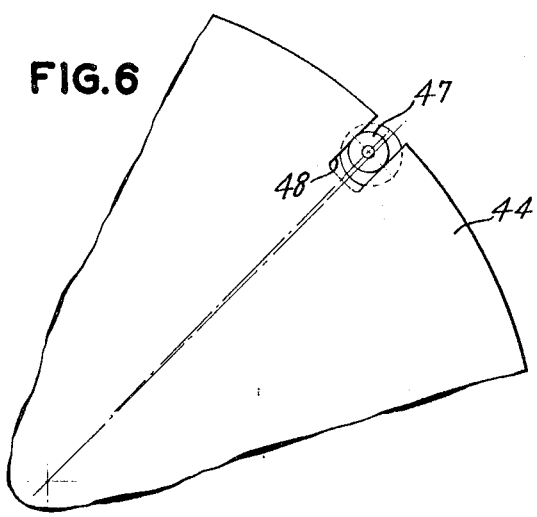
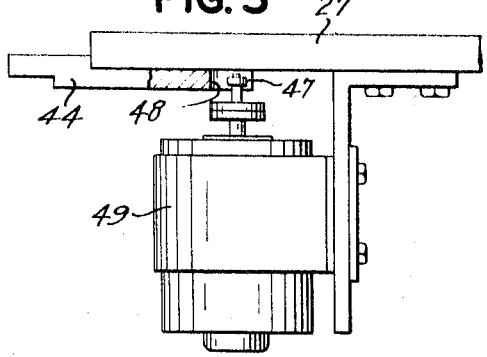

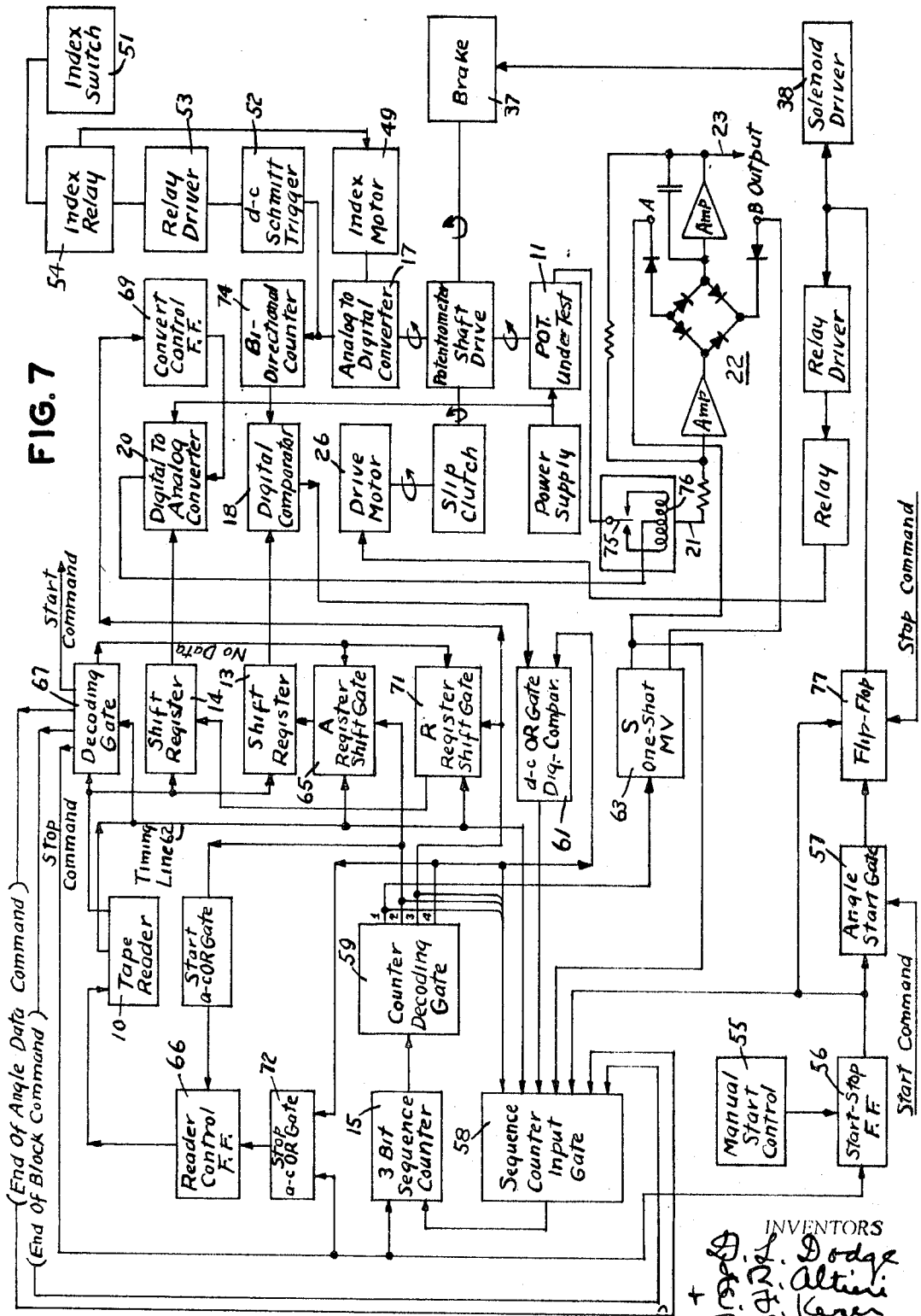

3,457,503
POTENTIOMETER LINEARITY AND CONFORMITY CHECKING APPARATUS INCLUDING PROGRAM STORAGE MEANS
David L. Dodge, Bronx, Joseph R. Altieri, Scarsdale, and Charles F. Kezer, Mineola, N.Y., assignors to Litton Industries, Inc., Beverly Hills, Calif.
Filed Jan. 13, 1965, Ser. No. 425,181
Int. Cl. G01r 27/02
U.S. Cl. 324—63
6 Claims

ABSTRACT OF THE DISCLOSURE

Apparatus for checking the function of a transducer, such as a potentiometer, adjusted during the test cycle through consecutive checking points, including signal storage means such as a perforated tape and tape reader for storing angle and function values, and means for comparing the function values stored in the signal storage means with those of the transducer under test when the stored angle values coincide with the angles to which the potentiometer under test is adjusted.

---

This invention relates to apparatus for checking linearity and/or conformity of potentiometers, shaft position sensors or encoders and other electromechanical transducers.

Since an important application of the invention is the testing of potentiometers, apparatus specifically designed for this purpose will be described in detail by way of example, it being understood that the apparatus may be readily adapted to the checking of other devices of the above-mentioned character. Precise checking of the linear and non-linear functions of potentiometers heretofore has required exhaustive, careful manual testing of the unit during manufacture, and this requires skill, experience and attentiveness by those performing the tests. The principal deficiencies and shortcomings of the presently available function test methods and apparatus lie in their low speed of operation and limited accuracy. Even where the capability of the apparatus is high, the human factor leads to errors and attempts to increase speed cause a decrease in overall accuracy. Thus equipment is not available to test potentiometers and similar transducers rapidly with the accuracy needed for precision applications.

The object of the present invention, in general terms, is to provide apparatus for checking the function or characteristics of a transducer of this type accurately at high speed with a minimum of operator participation.

Another object of the invention is to improve the utility and flexibility of a stystem or apparatus of the character described by employing an input control of the program type, such as a control tape or card and a code reader, which enables transducers of different characteristics to be checked without substantial modification of the test apparatus, in most cases by merely changing the control tape or cards.

A further object of the invention is to increase the speed of checking by driving the shaft of the unit being tested continuously and reading the potential or output signal at desired checking points "on the fly." Preferably in accordance with a feature of the invention the consecutive output signals are stored momentarily as they are recorded, so that the checking speed is not limited by the speed of the recorder mechanism or other device for displaying, indicating or recording the output or "error" signals.

A still further object of the invention is to provide checking apparatus for transducers having program storage means containing shaft angle and desired voltage signal values in coded form, sensing means for detecting the angular positions of the transducer under test as it passes through the consecutive checking points, and means for comparing the coded function signals stored in the program storage means with the actual function of the transducer at each checking point to generate corresponding error signals.

In accordance with the invention, the checking apparatus comprises program storage means for controlling the test operation. The program storage means in the embodiment to be described by way of example consists of code storage means such as perforated or magnetic tape or cards containing control signals in coded form for controlling the checking operation. The potentiometer under test is provided with means such as a shaft encoder for enabling the angular checking points to be compared with the encoded information stored in the program storage means. The output or voltage ratio of the potentiometer is compared with the desired function value stored in the code storage unit at that point, and an error signal exists at each check point where even a minute difference is present between the actual and desired function values. Since the advance of the code storage means and the step of comparing the actual and desired function values may be effected rapidly, the checking operation is much faster than the previous manual checking methods. If the signals stored in the control unit are digitized and the signals from the test unit are analog signals or vice versa, digital-to-analog or analog-to-digital conversion may be employed without introducing appreciable time delay. Thus the invention enables rapid and precise checking of a transducer with a minimum of operator participation, and different types of transducers may be checked by merely changing the control tape or cards.

Other objects and advantages of the invention will be apparent from the following description of the embodiment thereof shown in the accompanying drawings, wherein FIG. 1 is a block diagram of the improved circuit and apparatus used for high-speed checking of a potentiometer under control of a program storage unit;

FIGS. 2 to 6 illustrate a portion of the test apparatus including the cam adjustment mechanism for indexing the shaft encoder before starting the checking run; and FIG. 7 is a complete schematic and block diagram of one embodiment of the invention, similar to that shown in abbreviated form in FIG. 1.

Referring to FIG. 1 of the drawings, a checking or testing system for precision potentiometers is shown in the form of a block diagram. Essentially the same apparatus would be used for checking other types of transducers. The apparatus comprises program storage means 10 for generating input signals adapted to check the voltage ratio at successive angular positions of the potentiometer 11 under test. The potentiometer 11 is continuously rotated from the initial or starting position during the test cycle.

The system further comprises angle and voltage ratio registers 13 and 14 controlled by the input control signals from the program storage means 10. A sequence control 15 is controlled by the program storage means and in turn controls the sequence of the steps in each cycle of the test operation.

The shaft of the potentiometer 11 is connected to an analog-to-digital converter 17, such as a shaft encoder, which converts the angular position of the potentiometer input shaft to digital code signals corresponding to those generated by the angle register 13. The register 13 and the shaft encoder 17 are connected to a comparator 18 which detects coincidence between the angular position of the potentiometer shaft and the input signal from the program storage means 10 to determine the instant when one of the consecutive test readings is to be made. If the test is designed to check the voltage ratio at 1° increments of the potentiometer shaft, for example, each time the shaft is advanced 1° the comparator 18 renders the voltage ratio register 14 operative to compare the input function or voltage signal from the program storage means 10 with the voltage readings from the potentiometer 11 by means including a digital-analog converter 20. The converter 20 converts the digital code output of the register 14 to a D-C potential which is compared with the potential on conductor 21 derived from the potentiometer 11 in a signal storage unit 22. The amplifier signal storage unit 22 generates an output error voltage in the conductor 23 of sufficient duration so that the signal may be displayed or recorded in a conventional strip chart recorder or converted by an analog-to-digital voltage conveter to digital form to be utilized in other ways (computation, comparison, etc.).

In a checking system of this character, which will be more fully described in one embodiment below with reference to FIG. 7, an outstanding advantage includes the ability to record error signals automatically at a high rate of speed while the input shaft of the potentiometer is continuously rotating. Thus the time for completing the test is reduced from the normal prolonged testing period to a few minutes even where hundreds of readings are taken. Another advantage of the system is its flexibility since different potentiometer functions and different types of potentiometers may be tested by merely changing the tape or other control storage element of the program storage means 10.

Before starting the test, it is necessary to index the encoder 17 so that the indicia on the encoder dial are in registry with the desired test positions of the transducer or potentiometer shaft. The encoder dial may be provided with the usual indicia which are spaced apart by an angle equal to the angular spacing of the test positions, for example, 1° apart. Then the indexing may be accomplished by aligning one of the encoder indicia with the initial or start position of the shaft. A typical mounting and indexing arrangement for a potentiometer 11 and encoder 17 is shown in FIGS. 2–6. The assembly comprises a rotatable shaft 25 which is rotated by a motor 26 mounted on a fixed supporting plate 27. As shown by way of example the motor 26 is connected to a drive pulley 28 on the shaft 25 by the belts 29 and 30. The input shaft of potentiometer 11 is clamped to the shaft 25 by a shaft lock 33. The shaft 25 is also attached to the rotatable shaft of the encoder 17 so that the motor 26 rotates the potentiometer 11 and the encoder shaft in unison.

An adjustable frictional drag, as indicated at 35, engages the edge of a brake disc 36 attached to the shaft 25. In addition, a releasable brake member 37 engages the periphery of the brake drum 36, said brake member being normally held against the brake drum by springs 38 to lock the shaft 25 against rotation. A solenoid 41 may be provided to release the brake after the encoder has been indexed.

The casing 43 of the encoder 17 is attached to an adjustable concentric slip plate frictionally engaging plate 27, whereby angular adjustment of the plate 44 changes the indexing of the encoder 17. In order to effect this adjustment, an eccentric cam 47 engaging a slot 48 in the plate 44 is mounted on the shaft of an indexing motor 49 (see FIGS. 5 and 6). When the index motor 49 is energized the rotation of the cam 47 effects an angular adjustment of the plate 44 and of the casing 43 of the encoder. As will be explained below, this indexing adjustment may be made before the commencement of the test cycle.

A complete test system is shown in FIG. 7, it being understood that the detailed circuit and apparatus are shown and described by way of explanation and the scope of the invention is not limited to the detailed system illustrated. The same reference numbers refer to the same elements or parts of the apparatus in FIGS. 1, 2 and 7.

Referring to FIG. 7, as stated above, the program storage means 10 may be, for example, of the perforated tape or magnetic tape type. The conventional card storage means, either of the perforated or magnetic type is to be considered the equivalent of tape storage means. By way of illustration, 8-level tape may be used with the perforated tape reader designated Model 2500, made by the Digitronics Corporation of Albertson, N.Y., for programming the test operation. The programming is achieved by a block format, each block of holes in the tape containing angle data, voltage ratio data and command characters to indicate the end of angle data and the end of the block, respectively. In a typical system, each block consists of four digits of angle data followed by the end of data command, followed by five digits of voltage ratio data and ending with the end of block command. The four digits of angle data allow electrical angles from 1° to 9999° to be checked at 1° intervals. The five digits of voltage ratio data provide reference voltage ratios from 0 to 99.999% in 0.001% intervals, for the data mentioned by way of example.

Briefly stated, the operation involves comparing the programmed angle with the cumulative angle of an incremental shaft encoder totaled in a bi-direction counter; when the cumulative angle equals the programmed angle, a sample and hold amplifier is gated; the programmed voltage ratio reference is compared with the actual potentiometer output and the amplifier holds the difference or error voltage for a sufficient time to obtain recording, display or conversion to digital data. Meanwhile the tape is advanced and a new block of information in the tape repeats the cycle for the next checking point.

In the checking system shown by way of example in FIG. 7, an index switch 51 is actuated to initiate the checking of potentiometer 11, after loading the control tape in the tape reader 10. Depending on the position of the converter or shaft encoder 17, the complemented output of the Schmitt trigger 52 is zero or one. If the output of the encoder is a zero, the complemented output of the Schmitt trigger 52 is a one. This activates the relay driver 53 to operate the index relay 54 when the index switch 51 is operated. The index relay 54 energizes the index motor 49 to turn the slip plate 44 as described above in connection with FIGS. 2 to 6, thereby indexing the encoder 17. When the output of the shaft encoder becomes a one, the complemented output of the Schmitt trigger will become a zero, unlatching the index relay 54 and de-energizing the index motor 49. If the encoder had already been in such position when the index switch 51 was operated that no indexing was required, the complemented output of the Schmitt trigger 52 would be a zero and the index relay 54 would not be energized when the index switch 51 was operated. When the encoder has been indexed as described, the manual start control 55, which may be a SPDT switch, is actuated to initiate the rotation of the potentiometer under test, the stepping of the control tape and the generation of error signals at desired checking points of the potentiometer 11 under test. The error signals may be indicated or recorded by conventional apparatus and no further participation by the operator is necessary.

In response to the operation of the start switch 55, a start-stop flip-flop 56 is set in the "start" condition. The output of the flip-flop 56 (in the start condition) is simultaneously applied to an angle divider start gate circuit 57 and a sequence counter input gate 58 controlling the 3-bit sequence counter 15. A 3-bit sequence counter would normally have 8 stable states and switches states whenever an input pulse is received from the counter input gate 58. In the system shown, the number of stable states is reduced to 4 by suppressing the other 4 states. This may be done by resetting the counter 15 to the first state at the end of the fourth state. The remaining 4 stable states are, for example, represented by permutations of the 3-bit sequence counter outputs, e.g., 001, 010, 011, 100. These states may be detected by conventional decoding gate circuits as is done in the counter decoding gate circuit 59. The gate circuit 59 may consist of four 3-input "and" gates.

The purpose of the counter input gate 58 is to detect the condition when one of the commands or control signals from the program storage means 10 is in coincidence with the particular stable state previously decoded, and change the state of the sequence counter accordingly. The stored control signals referred to are start-stop flip-flop output, digital comparator output or gate, timing line, and S one shot multivibrator output, as indicated in the diagram by the connecting lines between the counter input gate 58, the start-stop flip-flop 56, the D-C digital comparator "or" gate circuit 61, timing line 62 from the tape reader 10 and the S one shot multivibrator circuit 63. The counter input gate circuit 58 consists, for example, of a combination of "and" and "or" gates connected to the input of each flip-flop in the sequence counter 15.

When the start-stop flip-flop 56 is in the "start" condition, the 3-bit sequence counter 15 is toggled from the first to the second state. This applies a control level to the A register shift gate 65 and simultaneously triggers the tape reader control flip-flop 66 to advance the tape in the tape reader. The perforated tape reader, mentioned previously, is used with 8-level tape in the checking system shown by way of example in FIG. 7. Typically, it reads the tape, character by character, generating a control or timing output in addition to each character read. Each character may contain up to 8 bits or any combination thereof. Since a total of 255 permutations are available, and the numbers 0 thru 9 only use 10 of these permutations, the remaining 245 permutations may be used to convey information other than numeric data. The decoding gate 67 serves two purposes. First, it detects when a particular command character is being read by the tape reader. Each command so detected is indicated by a discrete output from the decoder 67. In the example shown in FIG. 7, there are four command outputs. These are the start command, the end of angle data command, the end of block command and the stop command. The second purpose of the decoding gate 67 is to detect the numeric and non-numeric characters.

When a non-numeric or forbidden character is thus detected it may be prevented from entering any of the numeric data storage registers. In the example shown in FIG. 7, the detection of a non-numeric character is indicated by a "No Data" output from the decoder gate 67.

As the tape advances, the "no-data" output of the decoding gate 67 prevents each tape-feed character from entering the angle-data shift register 13 by turning off the A register shift gate 65. As the tape advances over the first digit of angle-data, the "no-data" output from decoding gate 67 turns the A register shift gate 65 on, allowing the timing line 62 to shift the angle data into the angle data register 13. After the fourth digit of angle-data, the end-of-angle-data command in combination with the second state of the sequence counter 15 and the timing line sets the sequence counter in the third state. The setting of the sequence counter in the third state turns the A register shift gate circuit 65 off and resets the convert control flip-flop 69. In addition the third state in combination with the "no-data" line and the timing line 62 shifts the ratio data into the ratio-data register 14. After the fifth digit of ratio data, the end-of-block command in combination with the third state of the sequence counter 15 and the timing line 62 sets the sequence counter in the fourth state. The setting of the sequence counter in the fourth state turns off the R register shift gate circuit 71, sets the convert control flip-flop 69 into the convert condition and toggles the reader control flip-flop 66 (through the stop "or" gate 72) into the stop condition. In addition, the fourth state output is applied to the digital comparator output "or" gate 61. When the convert-control flip-flop 69 is set in the "convert" condition, the digital data in the R shift register 14 is converted to an equivalent analog voltage in any desired binary or binary coded decimal form.

Although the first test point can be at any desired mechanical angle, when the first test point is zero degrees, 0000 is programmed as the first block test point. Since the potentiometer shaft and the shaft encoder 17 will not rotate until the drive motor is energized, the cumulative angle indicated by the bi-directional counter 74 is 0000. Thus since the digital comparator 18 immediately indicates equality when the comparator output "or" gate 61 is gated by the fourth state, the output of said gate 61 in combination with the fourth state of the sequence counter input gate 58 immediately triggers the sequence counter 15 to the initial or first state. The setting of the sequence counter in the first state triggers the "sample" or S one-shot multivibrator 63, which gates the sample-and-hold amplifier 22 to sample and hold the difference or error voltage between the D–A converter 20 output and the output of the potentiometer 11 under test. The sample-and-hold amplifier 22 stores or extends the error voltage for a period of time long enough for it to be displayed or recorded or digitized by an A–D converter, for example. The holding time may be a few milliseconds or longer, depending upon test conditions and the character of the unit being tested. The amplifier 22 is conventional, being shown and described, for example, in the magazine "Electronics" (1961) vol. 34, pages 141–143. In order to detect the difference potential between the potentiometer output and the D to A converter output, and improve the signal-to-noise ratio and amplifier drift, the well-known chopper or vibrating contact may be used. The vibrating-armature chopper is widely used in electronic circuits and a suitable unit of this kind may be obtained from Airpax Electronics, Inc., Cambridge, Md., or from Stevens-Arnold, Inc., 7 Elkins St., South Boston, Mass. The potentiometer output may be connected to a vibrating contact 75 as shown, and the cooperating stationary contacts connected to the primary winding of transformer 76. The potential from the digital-to-analog converter 20 is connected to a midpoint tap on said primary winding of transformer 76, whereby a pulsating voltage is generated in the secondary winding of the transformer which is proportional to the difference between the input voltages representing the actual and desired functions of the potentiometer 11. After amplification by an A-C amplifier the signal may be demodulated or rectified.

At the end of the sample period, the output of the S one shot or monostable multivibrator 63 in combination with the first state of the sequence counter 15 sets the sequence counter in the second state, which re-starts the sequence of events described above for checking the next angular check point. However, for the programming of a check point other than zero, the start command in combination with the start condition of the start-stop flip-flop 56 sets the angle or drive control flip-flop 77 in the "on" condition, which energizes the solenoid 38 to release the brake 37 and starts the drive motor 26 through relay 78.

It will be seen that the operation involves comparison of the angle and function values stored in the program storage means with the transducer angle and output. Thus when the sequence counter is set in the fourth state, gating the digital comparator "or" gate, an inequality will result until the shaft position read out by the shaft encoder reaches the desired angle. At that point the programmed angle and the cumulative angle in the bi-directional counter will indicate equality, triggering the sample-and-hold error read-out and starting the next test step. After sampling the last test point, the sequence counter will be set in the second state restarting the tape reader. The "stop" command, the next stored character, resets the reader control flip-flop 66, stopping the reader and setting the start-stop flip-flop 56 in the stop condition and the drive control flip-flop 77 in the "off" condition, terminating the test.

The components of the system shown in FIG. 7 are not illustrated in detail, for the sake of simplicity, being well known in the art. For example, the "Control Engineer's Handbook," by J. G. Truxal, published 1958 by McGraw-Hill Book Company, shows in FIG. 5–65(a) and FIG. 5–60 a suitable digital-to-analog converter; on page 5–56, FIG. 5–55, a shift register; and in FIG. 5–63, an incremental shaft encoder. Likewise the other elements, such as amplifiers, switches, relays, electronic gate circuits and flip-flops are familiar to those skilled in the art. The invention resides in the combustion and interconnection of these well known devices to effect the desired result.

It will be apparent that the invention involves a novel apparatus for checking the function or characteristics of a transducer at a high rate of speed, with the further capability of testing transducers of widely different characteristics and construction without substantial modification of the test apparatus. While a specific embodiment of the invention has been described in detail for the purpose of explaining the underlying principles thereof, obviously changes in the arrangement illustrated and in the circuits thereof will occur to those skilled in the art as pointed out above, and may be made without departing from the scope of the invention.

What is claimed is:

1. Testing apparatus for checking the functions of transducers having rotary control shafts comprising program storage means containing encoded shaft angle and desired voltage signal codes for a plurality of checking points in the unit under test, means for rotating the control shaft of the transducer under test through consecutive checking points at which the function of the transducer is to be compared with specified optimum voltage codes stored in the program storage means, means for detecting coincidence of the angular position of the control shaft of the transducer with the angle codes of the successive checking points stored in the program storage means, means for converting the voltage signal codes stored in the program storage means into analog signals varying in amplitude with the variations in the specified function of the transducer as the control shaft thereof is turned to the respective checking positions, comparator means connected to the said transducer and said code converter means for generating an error signal representing the difference between the specified function and the actual function, and means responsive to said coincidence detecting means for rendering said comparator means operative to produce error signals at the successive checking points.

2. Apparatus for checking the function of a potentiometer having a rotatable input shaft comprising a power supply connected to the potentiometer, program storage means having encoded control signals representing angle and desired function test values stored therein, motor means for rotating the input shaft of the potentiometer under test through consecutive checking points, means for detecting coincidence of the shaft position and a stored angle value at said checking points, and means controlled by said detecting means and said program storage means for generating an error signal at each checking point where the actual function of the potentiometer departs from the desired or proper value.

3. Apparatus for checking the function of a potentiometer having a control shaft comprising means for rotating the shaft of the potentiometer, an output circuit connected to said potentiometer in which the voltage function of the potentiometer appears as the control shaft is turned, a shaft encoder connected to the shaft of said potentiometer, program storage means having encoded control signals representing angular checking points of the potentiometer shaft stored therein, means for generating function signals representing desired voltage ratios at each of said checking points, means for comparing said encoded angular control signals stored in the program storage means with the instantaneous positions of the potentiometer derived from said shaft encoder, and means responsive to coincidence between an encoded control signal representing a checking point and the angular position of the potentiometer shaft for comparing the function in said output circuit of the potentiometer with the function signal representing the desired voltage ratio at that point.

4. Apparatus for checking the function of a potentiometer having a control shaft, comprising a power supply connected to said potentiometer, means for adjusting the shaft of the potentiometer to generate a varying voltage function, a shaft encoder connected to the shaft of said potentiometer, program storage means having encoded control signals representing angular checking points of potentiometer adjustment and encoded control signals representing corresponding desired functions of said potentiometer at said checking points, means for comparing said encoded angular control signals stored in the program storage means with the output of said shaft encoder to detect successive checking points set up in the program storage means, and means including said comparing means and responsive to the voltage function of the potentiometer and the desired function represented by said encoded control signal for generating an error signal at each checking point when the actual and desired function values of the potentiometer under test are unequal.

5. Apparatus for checking a potentiometer and the like, comprising a power supply connected to said potentiometer, motor means for rotating the input shaft of the potentiometer during test, an output circuit connected to said potentiometer in which the actual voltage function of the potentiometer appears as the shaft is turned, program means containing stored signals representing the angles and corresponding desired voltage function values at the successive checking points for controlling the test, means detecting the actual angle of said input shaft, means for comparing the programmed angle stored in said program means with the actual angle of said input shaft, a sample and hold amplifier, connections between the output circuit of said potentiometer, the program means for controlling the test, and the sample and hold amplifier for impressing on said amplifier air input signal equal to the difference between the actual and desired function values, and means for gating the sample and hold amplifier when a programmed angle stored in said program means coincides with the angle to which the shaft of the potentiometer has been turned by said motor means.

6. Apparatus for checking a potentiometer and the like, comprising motor means for continuously rotating the input shaft of the potentiometer under test, an output circuit connected to said potentiometer in which the actual voltage function of the potentiometer appears as the shaft is turned, tape storage and readout means for programming the operation of the checking apparatus, said tape containing the angle and desired voltage function at checking points in coded form, means for sensing the actual angle to which said input shaft is turned, means for comparing the input shaft angle with the encoded angle, an error signal output circuit, and means including a sequencing means for controlling the stepping of the tape, the comparison of the shaft angle with the encoded angle stored in the tape and the activation of said error signal output circuit in proper sequence, for generating error signals representing the deviation between the actual and desired voltage functions at the checking points.

References Cited

UNITED STATES PATENTS

| | | | |
|---|---|---|---|
| 3,217,249 | 11/1965 | Scott | 324—63 |
| 1,177,638 | 4/1916 | Larson et al. | 310—79 XR |
| 2,909,769 | 10/1959 | Spaulding | 340—347 |
| 2,927,258 | 3/1960 | Lippel | 318—28XR |
| 3,098,969 | 7/1963 | Liss et al. | 324—63 |
| 3,127,587 | 3/1964 | Rasmussen et al. | 340—146.2 |
| 3,228,025 | 1/1966 | Welch | 340—347 |

OTHER REFERENCES

"Resolver Handbook," Reeves Instrument Corp., October 1960, pp. 22–23.

EDWARD E. KUBASIEWICZ, Primary Examiner

U.S. Cl. X.R.

324—98; 340—146.1

PO-1050
(5/69)

UNITED STATES PATENT OFFICE
CERTIFICATE OF CORRECTION

Patent No. 3,457,503          Dated July 22, 1969

Inventor(s) D. L. Dodge, J. R. Altieri and C. F. Kezer

It is certified that error appears in the above-identified patent and that said Letters Patent are hereby corrected as shown below:

Column 1, line 52, "stystem" should read - system -
Column 7, line 25, "combustion" should read - combination -
Column 8, line 74, "air" should read - an -

SIGNED AND
SEALED
DEC 2 - 1969

(SEAL)
Attest:

Edward M. Fletcher, Jr.
Attesting Officer

WILLIAM E. SCHUYLER, JR.
Commissioner of Patents